US008924093B2

United States Patent
Husson

(10) Patent No.: US 8,924,093 B2
(45) Date of Patent: Dec. 30, 2014

(54) POWER TAKE OFF FOR TRACTOR

(75) Inventor: Geoffroy Husson, Beauvais (FR)

(73) Assignee: AGCO SA, Beauvais (FR)

( * ) Notice: Subject to any disclaimer, the term of this patent is extended or adjusted under 35 U.S.C. 154(b) by 110 days.

(21) Appl. No.: 13/505,762

(22) PCT Filed: Oct. 15, 2010

(86) PCT No.: PCT/EP2010/065549
§ 371 (c)(1),
(2), (4) Date: May 3, 2012

(87) PCT Pub. No.: WO2011/054656
PCT Pub. Date: May 12, 2011

(65) Prior Publication Data
US 2012/0221214 A1  Aug. 30, 2012

(30) Foreign Application Priority Data
Nov. 3, 2009  (GB) .................................. 0919240.2

(51) Int. Cl.
*G06G 7/00*  (2006.01)
*B60K 25/02*  (2006.01)

(52) U.S. Cl.
CPC ...................................... *B60K 25/02* (2013.01)
USPC .......................................................... 701/50

(58) Field of Classification Search
USPC ..................... 701/50–51; 477/34, 70, 86, 107
See application file for complete search history.

(56) References Cited

U.S. PATENT DOCUMENTS

2007/0227801 A1  10/2007  Loeffler
2010/0151984 A1*  6/2010  Viitasalo et al. .............. 475/269

FOREIGN PATENT DOCUMENTS

| DE | 10332216 A1 | 2/2005 |
| EP | 0677415 A2 | 10/1995 |
| EP | 1855029 A2 | 11/2007 |
| JP | 59067120 A | 4/1959 |
| WO | WO-2008/142523 A2 | 11/2008 |
| WO | WO-2008/142525 A1 | 11/2008 |

OTHER PUBLICATIONS

International Search Report for International Application No. PCT/EP2010/065549 Dated Jan. 17, 2011.
UK Search Report for UK Application No. GB0919240.2 Dated Jan. 21, 2010.

\* cited by examiner

*Primary Examiner* — Yonel Beaulieu

(57) ABSTRACT

A tractor (10) comprising a power takeoff stub (20) which is drivingly connected to an engine (12) by a driveline (14) is provided. A power takeoff clutch (16) is provided in the driveline for selectively powering the power takeoff stub. A first hydraulic pump (26) is drivingly connected to the driveline between the engine and the power takeoff clutch, while a hydraulic pump/motor (30) is drivingly connected to the driveline between the power takeoff clutch and the power takeoff stub. The pump/motor can operate as a pump driven by the connection to the driveline so as to deliver an additional hydraulic output (B) when required for high capacity implements for example. The PTO clutch (16) can be employed to selectively control operation of the pump/motor. Alternatively, the pump/motor can serve as a motor driven by a hydraulic connection (35) to the first hydraulic pump. In combination with disengagement of the PTO clutch, the pump/motor can provide a hydrostatic drive for the PTO stub.

9 Claims, 1 Drawing Sheet

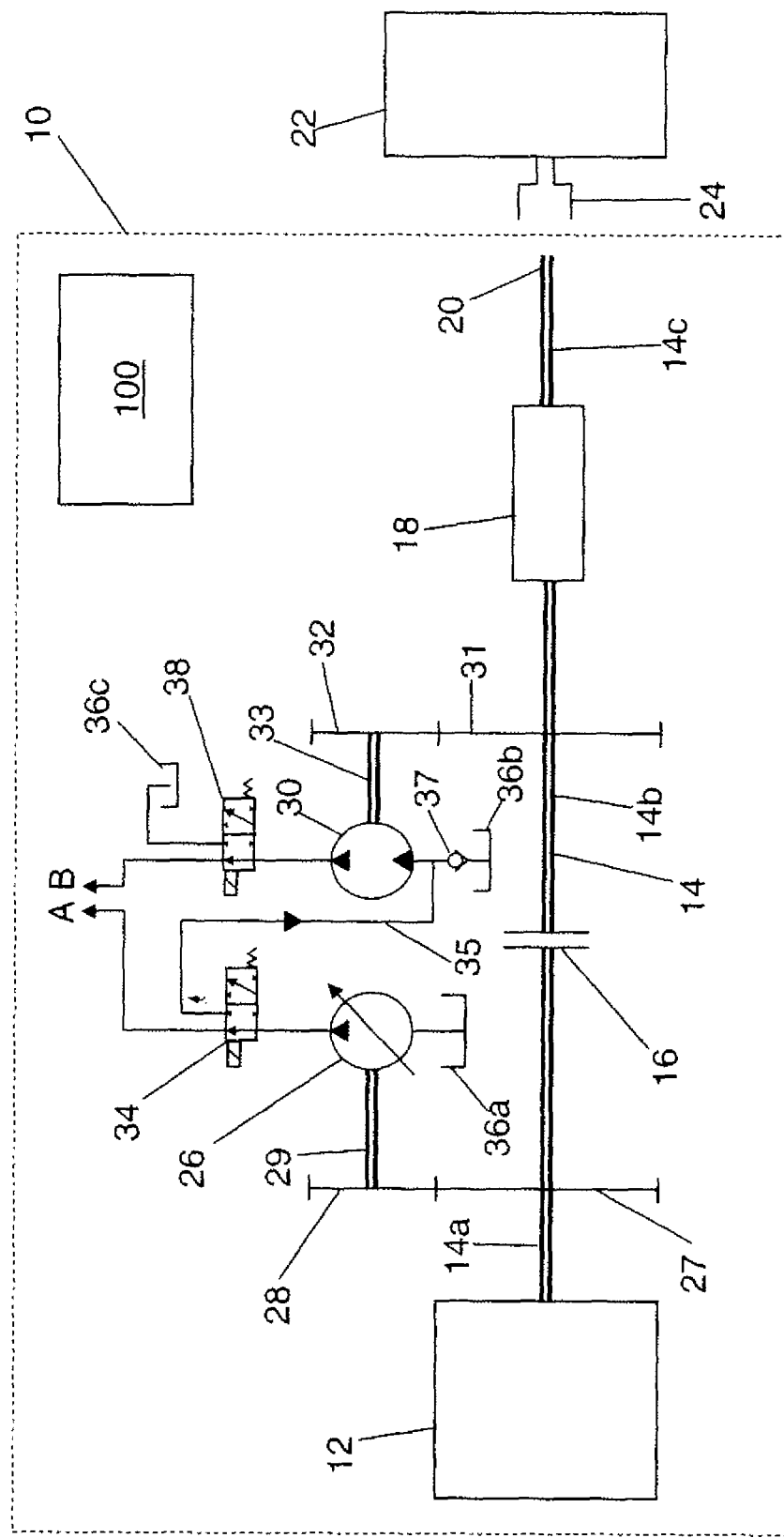

POWER TAKE OFF FOR TRACTOR

The invention relates to hydraulic supply systems fitted to agricultural tractors.

Tractors typically include at least one hydraulic pump which is driven by the output of an engine to supply various consumers on the vehicle. Many of the tractor systems are hydraulically powered such as steering, brakes and auxiliary consumers which supply pressurised fluid to attached implements having hydraulic motors. The continuing increase in implement and tractor size is placing an increasing demand on tractor manufacturers to increase the capacity of hydraulic supplies employed for implements. For example, modern seeders often include a large hydraulic motor to create the required air supply for the pneumatic seed delivery system. The hydraulic flow demanded exceeds the supply of some existing tractors.

It is therefore an object of the invention to provide a tractor having an improved hydraulic supply system.

In accordance with the invention there is a tractor comprising a power takeoff (PTO) stub which is drivingly connected to an engine by a driveline which includes a PTO clutch for selectively powering the power takeoff stub, a first hydraulic pump drivingly connected to the driveline between the engine and the PTO clutch, and a hydraulic pump/motor drivingly connected to the driveline between the PTO clutch and the PTO stub, wherein the pump/motor can operate either as a pump driven by the connection to the driveline or as a motor driven by a hydraulic connection to the first hydraulic pump.

In the past, tractor manufacturers have increased the available hydraulic supply by (a) increasing the size of the existing hydraulic pump, and/or (b) providing an additional hydraulic pump which can be utilized at time of high demand. The latter carries the disadvantage of requiring an extra mechanical drive which can be selectively engaged and disengaged. In accordance with the invention the pump/motor is drivingly connected to the driveline on the output side of the PTO clutch. Therefore, the pump motor can provide additional hydraulic supply when required by simple engagement of the PTO clutch. Advantageously, the functionality of the PTO clutch is exploited to selectively drive the additional hydraulic pump.

Furthermore, by providing a hydraulic pump which can also serve as a motor, the same component can be used to power the PTO stub hydrostatically by 'tapping off' hydraulic flow from the first hydraulic pump. Advantageously, this hydrostatic PTO drive can be employed for powering implements which demand a low power. For example, this may include fertilizer spreaders. By severing the mechanical relationship between the engine speed and the PTO stub speed, the engine can be run at a low speed for such low power implements thus improving the fuel efficiency.

Preferably the tractor further comprises an electronic control unit (ECU) which controls engagement of the power-take-off clutch and controls the hydraulic flow between the first hydraulic pump and the pump/motor over said hydraulic connection.

The tractor may further comprise a PTO gearbox connected in the driveline between the driven connection to the hydraulic pump/motor and the power-take-off shaft, the PTO gearbox including at least one input to output driving ratio and a neutral mode. Advantageously, said hardware allows the PTO clutch to be employed to selectively drive the hydraulic pump/motor without affecting the output speed of the power-take-off stub. For example, the PTO clutch may be engaged whilst the PTO gearbox delivers a neutral mode thus driving the hydraulic pump motor but not the PTO stub.

The ECU may also control the input-to-output ratio of the PTO gearbox.

As mentioned above the provision of a hydraulic pump/motor on the output side of the PTO clutch delivers increased functionality for the component itself offering several modes of operation. In accordance with another aspect of the invention there is provided a method of operating a tractor as describe above comprising the steps of receiving a signal which is indicative of a hydraulic flow demand over a first threshold value and engaging the PTO clutch in response to said signal.

Said mode of operation exploits the hydraulic pump/motor as a pump which provides additional hydraulic flow to that supplied by the first hydraulic pump. This mode of operation may be initiated automatically upon receipt of said signal or manually in response to a driver command. The method may further comprise the step of combining the hydraulic outputs from the two hydraulic pumps so as to deliver a single hydraulic output. Alternatively, the two pumps may supply different hydraulic circuits as required.

The method may further comprise the step of disengaging the PTO clutch in response receiving a signal which is indicative of a hydraulic flow demand below a second threshold value. Similarly to above, said disengagement may be initiated automatically or manually.

In accordance with a further aspect of the invention the tractor described above may be operated according to a method which comprises the steps of receiving a low PTO load signal which is indicative of an implement having an operating PTO demand which is below a load threshold value being attached to the PTO stub, receiving a PTO-on demand signal, disengaging the PTO clutch in response to receiving said low PTO load signal and PTO-on signal and operating the hydraulic pump/motor as a motor by delivering a hydraulic flow thereto via said hydraulic connection so as to drive the PTO shaft hydrostatically.

Advantageously, the pump/motor in this mode of operation is exploited as a motor which is powered by a hydraulic supply from the first hydraulic pump. In combination with the disengagement of the PTO clutch, a fully hydrostatic PTO drive is provided. In the case of a PTO gearbox being provided between the driven connection to the hydraulic pump motor and the PTO stub then the desired input-to-output ratio can also be chosen in this hydrostatic mode. This mode of operation is particularly suitable for implement which present a low load such as centrifugal spreaders.

In yet a further aspect of the invention the tractor described above in accordance with the invention may be operated according to a method which comprises the steps of: receiving a high inertia PTO load signal which is indicative of an implement having an operating PTO demand which is above a start-up inertia threshold value being attached to the PTO stub, receiving a PTO-on demand signal, disengaging the PTO clutch in response to receiving said high inertia PTO load signal and PTO-on demand signal, then, operating the hydraulic pump/motor as a motor by delivering a hydraulic flow thereto via said hydraulic connection so as to drive the PTO shaft hydrostatically, and when the output speed of the PTO shaft is sensed to exceed a threshold value, engaging the PTO clutch.

Problems associated with sudden engagement of a PTO clutch when driving an implement which has high inertia characteristics are well known. For example, the sudden engagement of a PTO drive connected to a large baler puts a large amount of strain on the driveline sometimes resulting in failure of at best a shear bolt and at worst the driveline itself. The pump/motor provided in accordance with the invention can advantageously be employed to initiate rotation of the PTO stub before engagement of the PTO clutch thereby reducing strain on the overall driveline. Once the PTO clutch is fully engaged and the PTO stub is drivingly connected to the engine output then the pump/motor can cease to drive the PTO stub as required.

Further advantages of the invention will become apparent from the following description of a specific embodiment with reference to the appended drawing in which:

FIG. 1 shows in highly schematic form a tractor in accordance with an example embodiment of the invention.

With reference to FIG. 1 an agricultural tractor is represented by the dashed box 10. The tractor 10 itself is of known construction and common features will not be described in any further detail.

The tractor 10 comprises an engine 12 which may be an internal combustion engine or, alternatively, an electric motor. In any case, the engine 12 delivers output power in the form of torque to a first driveshaft 14a which is drivingly connected to a second driveshaft 14b via a power-take-off (PTO) clutch 16. At its output end the second driveshaft 14b is connected to a PTO gearbox 18 which controls an input-to-output driving ratio between the second driveshaft 14b and a third driveshaft 14c. The three driveshafts 14a, 14b and 14c together with the PTO clutch 16 and PTO gearbox 18 provide a driveline 14 which drivingly connects the output of engine 12 to a PTO stub 20. Although shown in alignment in FIG. 1 the driveline 14 may be formed of various sections which are not necessarily in axial alignment.

An implement, represented by box 22 may be a baler, a fertilizer spreader or a seeder to name just three of many possibilities. The implement 22 includes an implement PTO shaft 24 which can be attached to the PTO stub 20 of the tractor 10. Driven rotation of PTO stub 20 therefore provides a power input to implement 20 to drive the various operating functions.

The tractor 10 further comprises a variable displacement hydraulic pump 26 which is drivingly connected to the first driveshaft 14a via gears 27,28 and driveshaft 29. Furthermore, the tractor 10 comprises a hydraulic pump/motor 30 which is drivingly connected to the second driveshaft 14b by gears 31,32 and driveshaft 33.

The output of variable displacement pump 26 is connected to a two position directional control valve 34 which selectively directs the pressurised fluid to hydraulic output A or to the input side of fixed displacement pump motor 30 via hydraulic connection 35. Variable displacement pump 26 is supplied with fluid, typically oil, by a reservoir 36a.

When operating as hydraulic pump, pump/motor 30 is supplied with hydraulic fluid via check valve 37 by reservoir 36b. The output of pump/motor 30 is conveyed to a second directional control valve 38 which directs the pressurised fluid to hydraulic output B or to reservoir 36c. Although shown as three separate components, the three reservoirs 36a, 36b and 36c may be provided by a single common reservoir and is preferably located somewhere within the transmission housing of the tractor 10.

The tractor 10 further comprises an electronic control unit (ECU) 100 which controls engagement of clutch 16 the input-to-output ratio of variable displacement pump 26, the input-to-output ratio of PTO gearbox 18 and the activation of directional control valves 34,38 which are activated by solenoids. For simplicity the connections between ECU 100 and the associated components are not shown.

The tractor 10 is operable in a number of different modes, some of which will now be described.

Low Hydraulic Demand, Zero PTO Load

When the hydraulic flow demand is below a predetermined threshold, the supply is provided by only the variable displacement pump 26. In this case the first directional control valve 34 is set to the first position (shown in FIG. 1) and the PTO clutch 16 is disengaged. Therefore the fixed displacement pump motor and the PTO stub 20 remain inactive.

Low Hydraulic Demand, Non-Zero PTO Load

With an implement 22 attached and demanding a PTO drive the PTO clutch 16 is engaged so as to drivingly connect PTO stub 20 to the engine output. In this case where only a low demand is placed on the hydraulic flow the directional control valve 38 is switched to the second position which dumps the output of hydraulic pump/motor 30 which is driven by the second driveshaft 14b and is thus operating as a hydraulic pump. The output of pump/motor 30 is dumped into hydraulic reservoir 36c.

PTO gearbox 18 is controlled to deliver the desired input-to-output ratio which is typically 540, 750 or 1000 rpm at a normal engine operating speed.

High Hydraulic Demand

In order to meet a high hydraulic demand which is above a predetermined threshold the pump/motor 30 is employed to provide an additional hydraulic flow to that of variable displacement pump 26. When a demand for a hydraulic flow over the predetermined threshold is sensed, a signal is received by ECU 100 which then automatically engages the PTO clutch 16 so as to drive pump/motor 30 from the engine 12. Both the directional control valves 34,38 are set to the first position as shown in FIG. 1 which directs the respective outputs from the hydraulic pumps 26,30 to hydraulic outputs A,B. These outputs A,B may be combined to provide a single hydraulic output or kept separate to drive respective hydraulic circuits.

In this mode of operation the drive to PTO stub 20 can be selectively engaged by controlling PTO gearbox 18 as required. When no PTO output is required the PTO gearbox 18 simply engages a neutral mode.

Zero Hydraulic Demand, Low PTO Load

In this mode of operation the pump/motor 30 operates as a motor which is powered by pressurised hydraulic fluid directed via hydraulic connection 35 from the output of variable displacement pump 26. In response to a signal from ECU 100 the first directional control valve 34 is switched to the second position in which the hydraulic output from variable displacement pump 26 is directed to the input side of pump/motor 30. This has the effect of driving shaft 33 and gears 32 and 31. ECU 100 also disengages clutch 16 so as to allow the rotation of driveshaft 14b powered by the pump motor 30 only.

Second directional control valve 38 is also switched to the second position wherein the output flow of pump motor 30 is dumped into reservoir 36c.

This delivers a hydrostatic drive for the PTO stub 20 and is particularly suitable for low load implements such as centrifugal spreaders. Advantageously, the output speed of the PTO stub 20 is only dependent upon the fluid delivered by variable displacement pump 26. This allows the PTO stub 20 to be driven at the desired speed whilst the engine speed is kept low, thereby improving fuel efficiency.

This mode of operation may be initiated automatically in response to the ECU 100 receiving a signal which indicates that an implement 22 having a low PTO load is attached to the tractor 10. Alternatively, the mode may be initiated manually by a driver who can determine that a hydrostatic PTO drive is sufficient for the task at hand.

High Inertia PTO Start-Up Mode

In the case of an implement having a high inertia PTO being attached to the tractor 10 the pump/motor 30 may be exploited as a motor to initiate rotation of the PTO stub 20 before engagement of PTO clutch 16. Advantageously this avoids strain being placed upon the PTO clutch 16 and reduces the risk of damage to shear bolts and the like.

In an example operating sequence, ECU 100 receives a 'high inertia PTO load' signal which may be in response to automatically sensing that, for example, a large baler is attached to the tractor or, alternatively, a driver manually entering the presence of the baler. In response to a PTO-on demand signal received from the driver the ECU 100 switches the first directional control valve 34 to the second position thus delivering a supply of pressurised fluid to the pump/motor 30 causing rotation of the driveshaft 14b whilst the PTO clutch 16 remains disengaged. When the output speed of the PTO stub 20 reaches a predetermined value, e.g. 100 rpm, ECU 100 commands engagement of the PTO clutch 16 so as to provide a direct mechanical connection between engine 12 and PTO gearbox 18. This action may be coupled with, or followed by, reverting directional control valve 34 to the first position thus ceasing the motor operation of pump/motor 30.

It should be appreciated that the transmission components associated with propulsion of the vehicle are not directly relevant to the invention and, as such, FIG. 1 omits all transmission components and such gearboxes. However, it should also be appreciated that the propulsive transmission will be typically driven by first driveshaft 14a, although not exclusively so.

Although shown as a two position device, directional control valve 34 may be replaced with a valve which can simultaneously provide a hydraulic flow output A and provide a hydraulic flow to pump motor 30. In other words, the operation of first hydraulic pump 26 need not be mutually exclusive in providing hydraulic output A and driving pump/motor 30.

In a further alternative to the described embodiment, the ECU 100 may be omitted whilst providing for manual control of the various valves, clutches and gearboxes. For example, PTO clutch 16 may be controlled manually by a lever whilst directional control valves 34,38 may also be switched manually.

In summary, there is provided a tractor comprising a power takeoff stub which is drivingly connected to an engine by a driveline. A power takeoff clutch is provided in the driveline for selectively powering the power takeoff stub. A first hydraulic pump is drivingly connected to the driveline between the engine and the power takeoff clutch, whilst a hydraulic pump/motor is drivingly connected to the driveline between the power takeoff clutch and the power takeoff stub. The pump/motor can operate as a pump driven by the connection to the driveline so as to deliver an additional hydraulic output when required for high capacity implements for example. The PTO clutch can be employed to selectively control operation of the pump/motor. Alternatively, the pump/motor can serve as a motor driven by a hydraulic connection to the first hydraulic pump. In combination with disengagement of the PTO clutch, the pump/motor can provide a hydrostatic drive for the PTO stub.

The invention claimed is:

1. A tractor comprising a power takeoff stub which is drivingly connected to an engine by a driveline which includes a power takeoff clutch for selectively powering the power takeoff stub, a first hydraulic pump drivingly connected to the driveline between the engine and the power takeoff clutch, and a hydraulic pump/motor drivingly connected to the driveline between the power takeoff clutch and the power takeoff stub, wherein the pump/motor can operate either as a pump driven by the connection to the driveline or as a motor driven by a hydraulic connection to the first hydraulic pump.

2. A tractor according to claim 1, further comprising an electronic control unit which controls engagement of the power takeoff clutch and controls the hydraulic flow between the first hydraulic pump and the pump/motor over said hydraulic connection.

3. A tractor according to claim 1, further comprising a power takeoff gearbox connected in the driveline between the driven connection to the hydraulic pump/motor and the power takeoff stub, the power takeoff gearbox including at least one input-to-output driving ratio and a neutral mode.

4. A tractor according to claim 2, wherein the electronic control unit also controls the input-to-output ratio of the power takeoff gearbox.

5. A method of operating a tractor comprising:
providing a power takeoff stub which is drivingly connected to an engine by a driveline which includes a power takeoff clutch for selectively powering the power takeoff stub, a first hydraulic pump drivingly connected to the driveline between the engine and the power takeoff clutch, and a hydraulic pump/motor drivingly connected to the driveline between the power takeoff clutch and the power takeoff stub, wherein the pump/motor can operate either as a pump driven by the connection to the driveline or as a motor driven by a hydraulic connection to the first hydraulic pump;
receiving a signal which is indicative of a hydraulic flow demand over a first threshold value; and
engaging the power takeoff clutch in response to said signal.

6. A method according to claim 5, further comprising the step of combining the hydraulic outputs from the first hydraulic pump and the hydraulic pump/motor.

7. A method according to claim 5, further comprising disengaging the power takeoff clutch in response to receiving a signal which is indicative of a hydraulic flow demand below a second threshold value.

8. A method of operating a tractor comprising:
providing a power takeoff stub which is drivingly connected to an engine by a driveline which includes a power takeoff clutch for selectively powering the power takeoff stub, a first hydraulic pump drivingly connected to the driveline between the engine and the power takeoff clutch, and a hydraulic pump/motor drivingly connected to the driveline between the power takeoff clutch and the power takeoff stub, wherein the pump/motor can operate either as a pump driven by the connection to the driveline or as a motor driven by a hydraulic connection to the first hydraulic pump;
receiving a low PTO load signal which is indicative of an implement having an operating power takeoff demand which is below a load threshold value being attached to the power takeoff stub;
receiving a PTO on signal;
disengaging the power takeoff clutch in response to receiving said low PTO load signal and PTO on signal; and,
operating the hydraulic pump/motor as a motor by delivering a hydraulic flow thereto via said hydraulic connection so as to drive the power takeoff shaft hydrostatically.

9. A method of operating a tractor comprising:
providing a power takeoff stub which is drivingly connected to an engine by a driveline which includes a power takeoff clutch for selectively powering the power takeoff stub, a first hydraulic pump drivingly connected to the driveline between the engine and the power takeoff clutch, and a hydraulic pump/motor drivingly connected to the driveline between the power takeoff clutch and the power takeoff stub, wherein the pump/motor can operate either as a pump driven by the connection to the driveline or as a motor driven by a hydraulic connection to the first hydraulic pump;

receiving a high inertia PTO load signal which is indicative of an implement having an operating power takeoff demand which is above a start-up inertia threshold value being attached to the power takeoff stub;

receiving a PTO on signal;

disengaging the power takeoff clutch in response to receiving said high inertia PTO load signal and PTO on signal; then, operating the hydraulic pump/motor as a motor by delivering a hydraulic flow thereto via said hydraulic connection so as to drive the power takeoff shaft hydrostatically; and, when the output speed of the power takeoff shaft is sensed to exceed a threshold value, engaging the power takeoff clutch.

\* \* \* \* \*